Patented Dec. 21, 1937

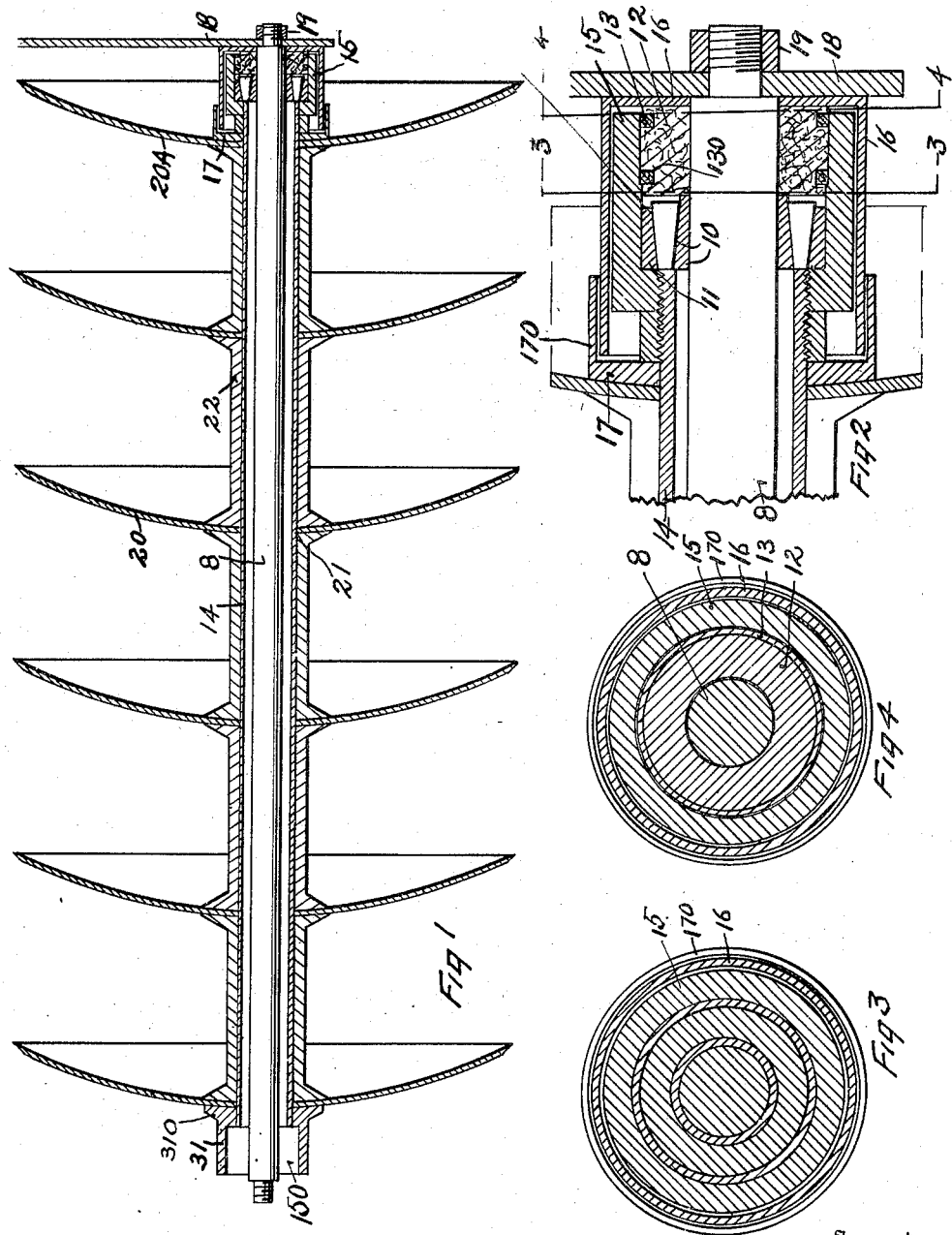

2,102,822

UNITED STATES PATENT OFFICE 2,102,822

BEARING FOR DISK HARROWS

Charles T. Viau, Fresno, Calif.

Application April 7, 1937, Serial No. 135,453

3 Claims. (Cl. 97—229)

My invention relates to a bearing for a disk harrow. The objects I have accomplished are the construction of a bearing for a disk harrow which is easy running, dust and moisture proof, adapted to be run in a constant bath of oil, and which can be assembled and disassembled with the disk harrow with ease.

These and other objects to be hereinafter disclosed are accomplished by means of the device hereinafter described, and illustrated on the accompanying drawing in which Fig. 1 is a longitudinal sectional view of one gang of a disk harrow, showing the bearing housing at one end, and the bearing housing with the bearing assembled therewith at the other end.

Fig. 2 is an enlarged sectional view of the bearing housing with the bearing assembled therewith.

Fig. 3 is a transverse sectional view of the housing and bearing assembled along the line 3—3 in Fig. 2.

Fig. 4 is a transverse sectional view of the housing and bearing along the sectional line 4—4 in Fig. 2.

Referring to the drawing, I have provided a frame 18 which is constructed according to well known principles of frame construction. An axle 8 extends across the frame and is attached thereto as hereinafter explained. A tubular member 14 has a hole therethrough of sufficient diameter to receive the axle. Each disk blade 20 has a center hole therethrough, shown as 21, of such diameter that the disks can be easily threaded on tube 14. Spacers 22 are also adapted to be threaded on said tube 14, and are positioned between the disk blades for the purpose of holding said blades spaced distances apart. At one end of tubular member 14 a bearing housing 31 is rigidly attached to the tubing, concentric therewith. Housing 31 and tube 14 can be assembled by welding or forming the parts integral, or by any other well known means of attaching two pieces of metal rigidly together.

Housing 31 has an enlarged annular base 310 which is adapted to form one jaw of a clamp, the other jaw being supplied by spool 22, which is adapted to clamp and hold in position the end blade of the gang. It is noted that a plurality of spools 22 are used, one spool being required between each two adjacent disk blades.

At the end of tube 14 opposite the end to which housing 31 is attached, I have provided a combined housing for the bearing and a nut 15 for holding the tube 14, the spools 22 and the disk blades 20 in a rigid assembly, and for this purpose the end of tubular member 14 is threaded to receive the threaded housing 15. A washer 17 is positioned around the tubular member between the end disk blade 20A and the threaded housing 15. When the disk blades, spacers and tubular member are assembled as shown in Fig. 1, the nut and housing 15 can be screwed tightly on the end of the tubular member to clamp the assembly together.

It is noted that the housing for holding the bearing has an annular recess therein which is of slightly larger diameter than the outside diameter of tubular member 14. This annular recess is designated as 150. A roller bearing cup 11 is fitted in said recess, and a roller bearing 10 is positioned on shaft 8 so that the bearing and the cup cooperate as a bearing.

A preferably solid felt retaining member 12 is slidingly, but snugly fitted to slide on to the end of shaft 8 and within the recess 150. This felt retaining member has one or more annular grooves 130 into which felt rings 13 are inserted. These felt rings are for the purpose of assisting in making the bearing dust proof. A dust cap 16 is adapted to cover housing 15. A rear dust cap is formed by washer 17 and flange 170 thereon. The axle 8 is attached solidly to the frame 18 by means of a nut 19 which can be locked thereon in any well known manner.

Having described my invention I claim as new and ask for Letters Patent:

1. In a disk harrow having a frame, a tubular member on which disk blades and spacers are assembled, an axle extending through the tubular member concentric therewith, and attached at either end to the frame, a bearing consisting of a housing having an annular recess therein, said housings being attached at either end of the tubular member with the recess positioned concentric with the tubular member, a roller bearing adapted to be fitted within the recess and around the axle, a closure adapted to enter the annular recess, said closure having annular grooves therein, and yielding rings adapted to enter said grooves, and when assembled therewith to bear against the inside wall of the recess.

2. A device described in claim 1 having dust caps adapted to cover the housing described.

3. In a disk harrow having a frame, a tubular member on which disk blades and spacers are assembled, an axle extending through the tubular member and attached at either end to said frame, bearings consisting of housings having annular recesses therein somewhat larger in diameter than the diameter of the tubular members, said housings being attached to the tubular member at either end thereof, the housing at one end being adapted to be screwed on the end of the tubular member, said housing having the screw connection being adapted to clamp the blades and the spools firmly on said tubular member, said housing, tubular member and axle being arranged concentric with each other, a roller bearing fitted around the axle and within the recess in the housing, and a closure for said recess.

CHARLES T. VIAU.